United States Patent

[11] 3,583,803

[72] Inventor Anthony L. Cole
P.O. Box 523, Mercer Island, Wash. 98040
[21] Appl. No. 783,805
[22] Filed Dec. 16, 1968
[45] Patented June 8, 1971

[54] MOTION PICTURE PROCESS AND MOTION PICTURE FILM HAVING WIDE-SCREEN ASPECT RATIO FRAMES
6 Claims, 6 Drawing Figs.

[52] U.S. Cl. .................................................. 352/239
[51] Int. Cl. .................................................. G03c 1/78
[50] Field of Search ........................................ 352/38, 239, 44, 241; 96/41

[56] References Cited
UNITED STATES PATENTS
1,032,172  7/1912  Zollinger ..................... 352/44
2,060,204 11/1936  Hammond, Jr. ............... 352/44X
3,396,021  8/1968  Monteleoni et al. .......... 352/38X OTHER REFERENCES
"British Kinematography" Vol. 24, No. 1, January, 1954. Pages 21 and 22.

Primary Examiner—Donald O. Woodiel
Attorney—Robert W. Beach

ABSTRACT: A scene photographed on a wide angle is printed substantially undistorted on motion picture film frames having wide-screen aspect ratio, and wide-screen pictures are projected from such film frames having substantially the same proportions. The film frames are substantially the same width as conventional frames transversely of the film and approximately half as high lengthwise of the film to provide an aspect ratio greater than two. Use of small perforations provides room for several soundstripes.

PATENTED JUN 8 1971 3,583,803
SHEET 1 OF 2
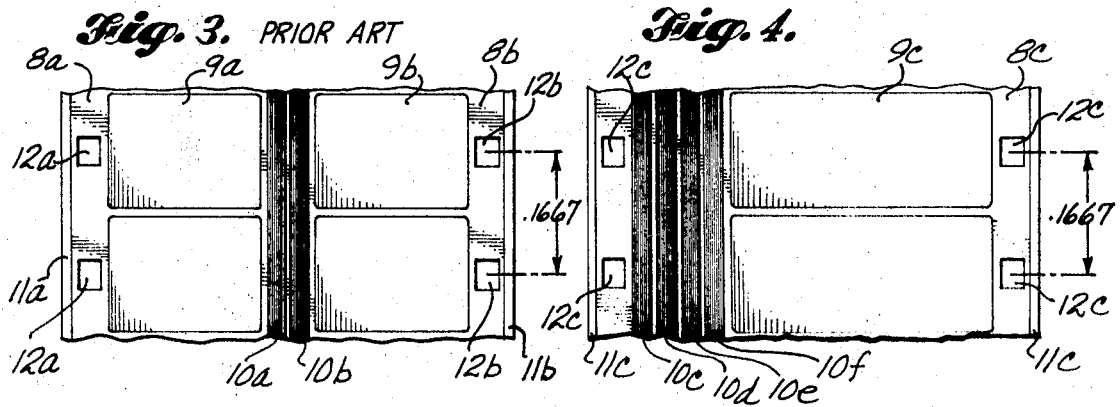
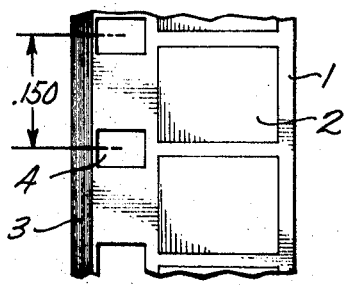
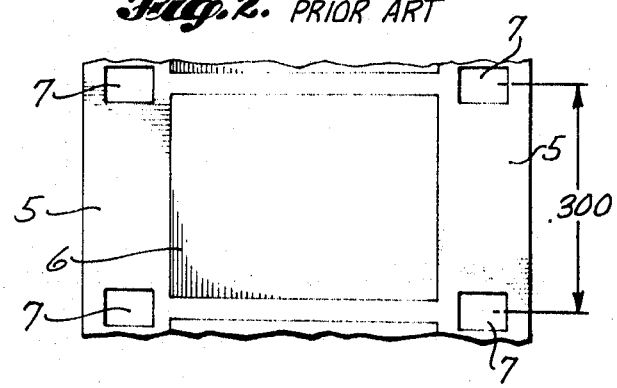
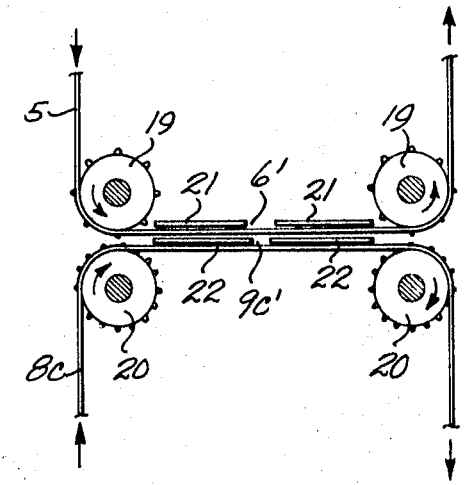
INVENTOR
ANTHONY L. COLE
BY
Robert W. Beach
ATTORNEY

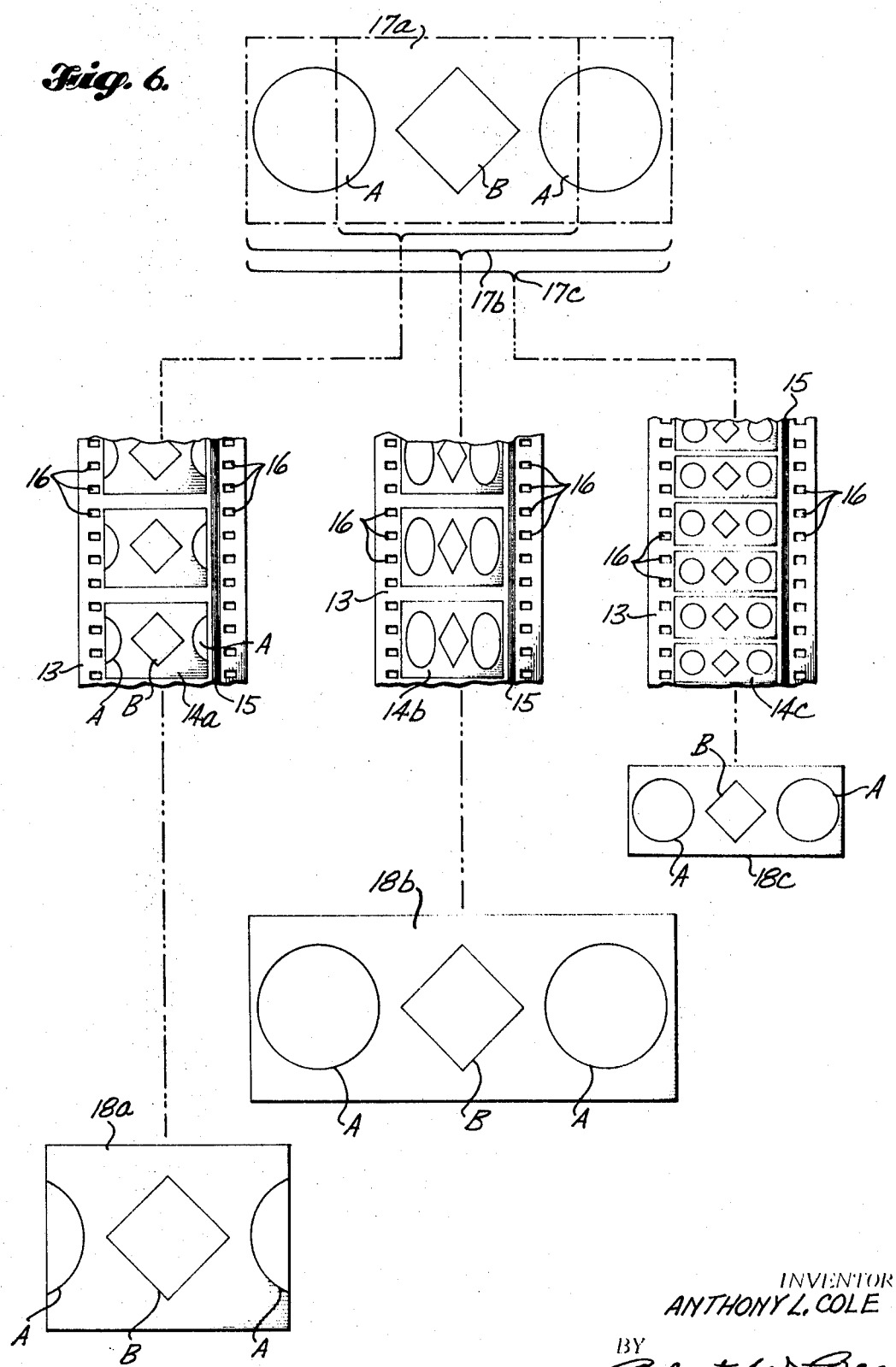

MOTION PICTURE PROCESS AND MOTION PICTURE FILM HAVING WIDE-SCREEN ASPECT RATIO FRAMES

A principal object of the invention is to provide a motion picture film having frames with an aspect ratio substantially the same as that of the scene photographed and of the picture projected from the film, thus providing maximum fidelity and minimum distortion of the scene photographed in the picture projected. More specifically, it is an object to photograph scenes and project pictures from motion picture films having aspect ratios of approximately 2.35:1 by utilizing the film having frames with an aspect ration of approximately 2.35:1. Such object can be accomplished by utilizing lens systems providing uniform magnification without anamorphic characteristics.

Another object is to provide a motion picture film from which a picture of greater brilliance can be projected with a given light source than can be projected from a conventional 8 mm. film or super 8 mm. film without increasing the film length. Also, it is an object to utilize film of conventional width such as 16 mm. or 35 mm. for accommodating twice as many frames as conventionally used and thus utilizing a film length approximately half as great as normally required for a motion picture of given duration.

In providing film having frames of aspect ratio substantially corresponding to the aspect ratio of the picture to be projected, it is an object to provide room for extra soundstripes, such as two stripes for stereo music and/or separate stripes for voice and for music, so that their relative intensity of reproduction can be altered and/or different voice soundstripes providing for narrative indifferent languages.

A further object is to enable standard film stock of 16 mm. width or 35 mm. width to be used for frames having substantially wide-screen aspect ratio. In using such films the sound tracks can be optical or magnetic and the film stock can be perforated to provide for the film being run at an appropriate speed and by equipment which is largely conventional. A related object is to enable such film to be projected from projectors, the mechanism of which differs only slightly from that of standard motion picture projectors.

An additional object is to provide film having frames with wide-screen aspect ratio produced by contact printing from standard film so that the full width of the frame is reserved, but the height is reduced so that a portion of the top and/or bottom of each original film frame is not reproduced.

FIG. 1 is an elevation of a section of conventional 8 mm. motion picture film with a single magnetic sound track.

FIG. 2 is an elevation of a section of conventional 16 mm. silent film.

FIG. 3 is an elevation of a section of 16 mm. film providing two super 8 mm. films, each having a sound track.

FIG. 4 is an elevation of a section of 16 mm. film having frames in accordance with the present invention and further having four sound tracks.

FIG. 5 is a diagrammatic elevation of a film contact printing mechanism.

FIG. 6 is a diagram illustrating the correlation between a scene photographed, sections of three alternative types of 35 mm. film on which the scene is photographed and representations of pictures projected from the respective films.

Film standards have been adopted by the motion picture industry in the United States, both amateur and professional. These standard films are of four types shown respectively in FIGS. 1, 2, 3 and 6.

FIG. 1 shows a conventional 8 mm. film strip 1 having frames 2, 0.175 of an inch wide and 0.132 of an inch high, adjacent to one edge of the strip. Along the opposite edge of the strip is a soundstripe 3 which may be of magnetic or optical type. Between the frames 2 and the soundstripe 3 are perforations 4 spaced apart 0.150 of an inch. This type of film has been the most popular film used for amateur motion picture photography.

A more expensive popular film for amateur use primarily has been the 16 mm. film 5 shown in FIG. 2. The film here illustrated is of the silent type having frames 6 which are 0.369 of an inch in width and 0.277 of an inch in height. The sprocket perforations 7 are of the same size as the perforations 4 in the 8 mm. film of FIG. 1, but are spaced apart 0.300 of an inch.

A motion picture film for amateur use which has become available much more recently than the 8 mm. film of FIG. 1 or the 16 mm. film of FIG. 2 is the super 8 film shown in FIG. 3. Two strips 8a and 8b of this film can be made by slitting 16 mm. film stock along its centerline. The frames 9a and 9b of this film are 0.212 of an inch in width and 0.159 of an inch in height, giving an aspect ratio of 1.33:1. Soundstripes 10a and 10b applied in side-by-side relationship along the central portion of the film stock will be carried by the films 8a and 8b, respectively, when the film stock is divided between such soundstripes. If the soundstripes are of the magnetic powder type, bands of 11a and 11b of such powder can be applied to the edges of the film stock so as to balance the thickness of the soundstripe portions of the film stock to promote even winding of the film. In this instance the perforations 12a and 12b for the two films are considerably smaller than the perforations 4 of the 8 mm. film shown in FIG. 1 and the perforations 7 of the 16 mm. film shown in FIG. 2. The use of such small perforations, which are customarily spaced apart 0.1667 of an inch, enable a greater portion of the film width to be used for the picture frames. Because the height of such frames is greater than the height of the frames of 8 mm. film, the perforations are spaced farther apart so as to provide one perforation for each frame.

In FIG. 4 film 8c according to the present invention is shown. The film stock utilized for this film is the same as that used for the film of FIG. 3 being of the 16 mm. type and of positive film character for projection on a screen. Also, opposite edges of this film have bands 11c of magnetic powder for balancing the thickness of the film if one or more soundstripes of the magnetic type are used. The perforations 12c along opposite edges of the film are the same in size and spacing as the perforations 12a and 12b in FIG. 3. This film, however, has three unique features.

The first unique feature of the film 8c shown in FIG. 4, as compared to the prior art films described above, is that the width of the film is the same as that of the 16 mm. film shown in FIG. 2 and is twice as wide as the 8 mm. film of FIG. 1 or the super 8 film cut from the film of FIG. 3 while having frames 9c of the same height as the frames 9a and 9b of the super 8 film and sprocket perforations of the same size and spacing as those of the super 8 film.

The second unique characteristic of the film 8c of the present invention shown in FIG. 4 is that, while the height of each frame 9c is the same as the height of a frame 9a or 9b of the super 8 film, namely, 0.159 of an inch, the width of each frame is approximately the same as the width of the frame 6 of the 16 mm. film shown in FIG. 2, namely, 0.374 of an inch, giving an aspect ratio of 2.35.

Thus, the area of each frame 9c of the film, according to the present invention, is more than twice as great as the area of the frame 2 of the 8 mm. film shown in FIG. 1, is almost twice as great as the frame 9a or 9b of the super 8 film and is more than half as great as the area of the frame 6 of the 16 mm. film shown in FIG. 2. Consequently, a picture projected from the positive film of FIG. 4 would be much brighter than a picture projected either from the positive film of FIG. 1 or from the positive film of FIG. 3 for a given source of illumination. Moreover, the aspect ratio of the frames 9c of the film 8c shown in FIG. 4 is much more desirable than the aspect ratio of the prior art frames shown in FIGS. 1, 2 and 3 for projection onto a wide screen. The aspect ratio of the frames 2 of FIG. 1, 6 of FIG. 2 and 9a and 9b of FIG. 3 are all approximately the same, namely, about 1.33:1, whereas the aspect ratio of each frame 9c is approximately 2.35:1. By provision of frames having such an aspect ratio, it is possible to photograph screens through a wide angle onto such film frames substantially undistorted and, in turn, to project wide-screen pictures from such frame s substantially undistorted.

Wide-screen pictures have an aspect ratio substantially greater than 1.3321, according to the definition of "wide-screen" in *Webster's Third New International Dictionary*. Customarily, film having frames with an aspect ratio of 1.33:1 is used for projecting wide angle pictures. Consequently, it is necessary to utilize an anamorphic lens system is photographing a wide-angle scene onto a negative film frame having an aspect ratio of 1.33:1 for the purpose of contracting the width of the scene to a greater extent than its height, to print directly a positive film of the same character and to use another anamorphic lens system when projecting a picture from such positive film for the purpose of converting the film record of the scene into a picture having proportions similar to those of the scene photographed. FIG. 6 illustrates a comparison of applicant's technique with those of the prior art.

Heretofore, it has been customary to use 35 mm. negative film for recording images to print directly 35 mm. positive films from which wide-screen pictures are to be projected. FIG. 6 illustrates three 35 mm. films 13 which have been used to photograph a scene. These films have frames 14a, 14b and 14c, respectively. Each of the films has a soundstripe 15, and the perforations 16 of the three films are identical. The frames 14a and 14b of the left and center films have a width of 0.839 of an inch and a height of 0.629 of an inch so that their aspect ratio is 1.33:1. The frames 14c of the right film have the same width as the frames 14a and 14b, namely, 0.839 of an inch, but the height of each frame 14c is only 0.355 of an inch, so that the aspect ratio is 2.35:1.

If the scene at the top of FIG. 6 is photographed onto the frames 14a of the left film without an anamorphic lens system being used, the portion 17a of the scene will be recorded, including only the right segment of the left circle A and the left segment of the right circle A. When the picture is projected from such a film without the use of an anamorphic lens system, the picture 18a will result, which has an aspect ratio of 1.33:1, corresponding to the aspect ratio of the film frames. When it is desirable to project a wide-screen picture, however, it has been customary to utilize an anamorphic lens system to contract the ratio, it of the wide scene 17b to a greater proportion than its height so that distorted pictures are recorded on the frames of the film. In order to project the wide-screen picture 18b from such a film, it is necessary to use an anamorphic lens system in the projector having lens characteristics corresponding to, but the reverse of, those provided in the camera used in taking the picture.

By using a film having frames 14c of the wide-screen aspect ratio, it is possible to photograph a scene 17c of the same width as the scene 17b without using an anamorphic lens system. From a film of this type, a wide-screen picture 18c can be projected by using a nondistorting lens system, but one which simply magnifies instead of using an anamorphic lens system. While the area of the frame 14c is less than the area of the frame 14a and the frame 14b, a wide-screen picture of as great brilliance as the pictures 18a and 18b can be obtained if the total area of the picture is considerably smaller as indicated in FIG. 6. MOreover, anamorphic lens systems absorb light so that they tend to reduce the brilliance of the picture.

Consequently, the 35 mm. film at the right of FIG. 6 is satisfactory for commercial theater wide-screen use, but has the advantage of being much more economical because a given length of film has twice as many frames on it. This means that for a motion picture feature of predetermined length, the length of film required is only one-half as much as required heretofore. For that reason, either the film reels may be smaller or fewer of them can be used for a given feature picture. Libraries of such motion picture films can consequently be more compact.

For use in providing entertainment for airplane passengers during flight, motion pictures are sometimes provided. The film shown in FIG. 4 is particularly advantageous for this use. Wide-screen pictures are preferred, yet it is desirable to keep the weight to a minimum. The projector which can be used to project wide-screen pictures from a film of the type shown in FIG. 4, will be equipped with simply a conventional magnifying lens, not an anamorphic lens. Also, the projector can be smaller because the film for a feature of given length is only half as long as that which would be required where standard 16 mm. film such as shown in FIG. 2 is used.

The third advantage of the film shown in FIG. 4 is that room is provided on 16 mm. film stock for several soundstripes illustrated as soundstripes 10c, 10d, 10e and 10f. Two of such soundstripes can, for example, be used to provide stereo music. Particularly under flight conditions, it may be desirable to increase the volume of voice reproduction over music reproduction and, if voice is recorded on a soundstripe different from that or those used for recording music, separate volume control elements may be provided for adjusting the volume produced from different soundstripes. Also, particularly in international air travel, it is desirable to produce the dialogue in different languages, whereas the music would be the same. For this reason, too, it is desirable to separate the voice from the music so that a listener can select the desired language reproduction in combination with the music reproduction. It may be desirable to utilize two soundstripes for stereo music and two for different languages or more than two of the soundstripes may be used for different languages while providing one soundstripe for monophonic music or providing no music soundstripe at all. The film illustrated in FIG. 4 has this versatility.

As has been indicated by FIG. 6, a wide-angle scene can be photographed on the film at the right having wide-angle aspect ratio frames 14c by using a symmetrical lens system rather than an anamorphic lens system. It is also possible, however, to print film having wide-aspect ratio frames 14c from standard film such as at the left of FIG. 6. Correspondingly, film having wide-aspect ratio frames 9c, such as shown in FIG. 4, can be produced by contact printing from standard 16 mm. film such as shown in FIG. 2. In each of these instances the width of the picture will be the same, but the height of the picture will be cropped to the extent of the difference in height between the frame 14c and the frame 14a of FIG. 6 or the frame 9c of FIG. 4 and the frame 6 of FIG. 2.

Representative contact printing mechanism for printing film with wide-screen aspect ratio frames is shown diagrammatically in FIG. 5. In this instance, standard 16 mm. film 5 is carried by sprockets 19. Film 8c, shown in FIG. 4 as having wide-screen aspect ratio frames 9c, is carried by sprockets 20. The sprockets 19 and 20 are arranged to place stretches of the two films in adjacent parallel relationship. Masks 21 are spaced apart to provide an aperture 6' corresponding to the height of a frame 6. Correspondingly, masks 22 overlie the film 8c and are spaced apart to provide an aperture 9c' of a width corresponding to the height of frames 9c. The sprockets 19 and the sprockets 20 are driven intermittently to index each of the films step-by-step, one frame at a time. Each frame 6 of the film 5 as it is moved into registry with the aperture 6' is printed on the corresponding frame 9c of the film 8c which is in registry with the aperture 9c'.

I claim:

1. A motion picture process which comprises photographing a wide-angle scene, printing such scene substantially undistorted on sequential wide-screen aspect ratio frames of a motion picture film of the order of 2.35 to 1 for projection, and from the frames of such film sequentially projecting through a nondistorting magnifying lens system substantially undistorted wide-screen picture having substantially the same aspect ratio as the film frames.

2. A motion picture film having frames of wide-screen aspect ratio of the order of 2.35 to 1 of positive film character with undistorted pictures for projection on a screen and arranged sequentially along length of the film with the greater dimension of each frame extending transversely of the length of the film, and said film having a row of indexing sprocket holes along at least one margin of the film between the film edge and the adjacent ends of the frames.

3. The motion picture film defined in claim 2, in which the opposite margins of the film are perforated, the frames are closer to one margin of the film than to the other margin of the film, and a plurality of soundstripes are located on the film between the frames and the perforations along such other margin of the film.

4. The motion picture film defined in claim 3, in which one soundstripe has recorded music without voice and another soundstripe has recorded voice without music.

5. The motion picture film defined in claim 3, in which different soundstripes have voice-recordings in different languages respectively.

6. The motion picture film defined in claim 3, in which different soundstripes have different music recordings, respectively.